United States Patent [19]
Enomoto et al.

[11] 4,363,546
[45] Dec. 14, 1982

[54] APPARATUS FOR ESTABLISHING ROUTINE SHOT DISTANCE OF TAKING LENS IN CAMERAS

[75] Inventors: Fujio Enomoto; Ichiro Morimoto, both of Hachioji, Japan

[73] Assignee: Olympus Optical Company Ltd., Tokyo, Japan

[21] Appl. No.: 300,178

[22] Filed: Sep. 8, 1981

[30] Foreign Application Priority Data

Nov. 7, 1980 [JP] Japan .................................. 55-156564
Nov. 7, 1980 [JP] Japan .................................. 55-156565

[51] Int. Cl.³ .......................... G03B 3/02; G03B 17/02
[52] U.S. Cl. .................................... 354/195; 354/187
[58] Field of Search ............................... 354/187, 195

[56] References Cited

U.S. PATENT DOCUMENTS

| | | | |
|---|---|---|---|
| 3,713,371 | 1/1973 | Kurihara et al. | 354/195 X |
| 3,798,670 | 3/1974 | Tanaka | 354/195 |
| 3,913,113 | 10/1975 | Yamashita | 354/195 |
| 4,171,894 | 10/1979 | Yamada | 354/187 |

FOREIGN PATENT DOCUMENTS 44-19472 8/1969 Japan .

*Primary Examiner*—Donald A. Griffin
*Attorney, Agent, or Firm*—Weinstein & Sutton

[57] ABSTRACT

An apparatus for establishing a routine shot distance of taking lens for camera which includes a lens protective cover is provided. The cover is movable between a first position in which it covers a taking lens and a second position in which it allows the taking lens to be exposed. An arrangement is provided for moving the taking lens to a position corresponding to a selected routine shot distance in response to the opening/closing movement of the lens protective cover. The position corresponding to a selected routine shot distance can be freely chosen.

8 Claims, 11 Drawing Figures

APPARATUS FOR ESTABLISHING ROUTINE SHOT DISTANCE OF TAKING LENS IN CAMERAS

BACKGROUND OF THE INVENTION

The invention relates to an apparatus for establishing a routine shot distance of a taking lens of a camera, and more particularly, to such apparatus in which the taking lens is automatically moved to its routine shot distance in interlocked relationship with the opening/closing of a lens protective cover of the camera.

A photographic camera is already known having a lens protective cover which is movable between a first position covering a taking lens and a second position where the taking lens is exposed and which is provided with a device for automatically bringing the taking lens to a position corresponding to a normal focussed distance as the protective cover is opened/closed.

Figure 1:
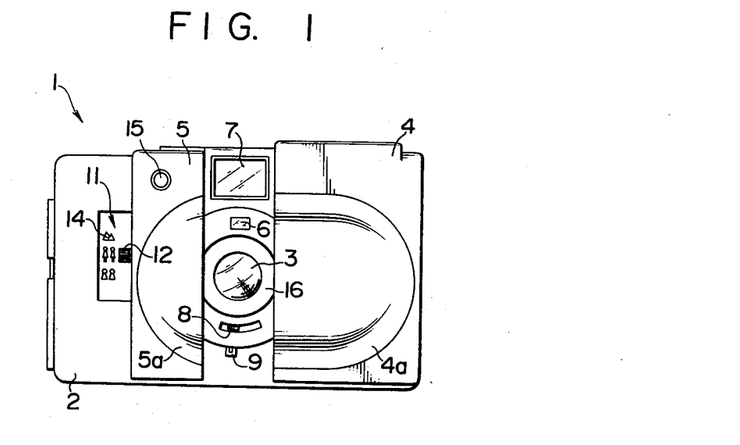
FIG. 1 is a front view of a camera which is provided with an apparatus for establishing a normal focussed distance.

FIG. 1 illustrates an example of a camera which is provided with such device for establishing a normal focussed distance of a taking lens. Camera 1 includes a body 2 having a front surface in which a taking lens 3 is centrally located, and is associated with a lens protective cover 4 which is movable between a first position where it covers the taking lens 3 and a second position where it allows the taking lens to be exposed. The protective cover includes a front wall which is located opposite to the front surface of the body 2 and which is disposed along the right-hand half of the body 2 so as to be slidable in the horizontal direction along the front surface of the body 2. It will be noted that the front wall is centrally formed with a semi-circular bulge 4a which projects forwardly from its left-hand edge, as viewed in FIG. 1, so as to avoid its abutment against a lens frame 16 which slightly projects beyond the front surface of the body 2, as the protective cover is moved to its lens covering position.

An abutment frame 5 is integrally formed with the body 2 at a location to the left of the taking lens 3 so that the left-hand edge of the protective cover 4 may abut against it whenever it has moved to its closed position. Again, it will be noted that the abutment frame 5 is centrally formed with a semi-circular bulge 5a which extends from its right-hand edge and projecting forwardly. It will be seen that the combination of the semi-circular bulges 5a, 4a is effective to define a unitary oblong configuration when the protective cover 4 closes the taking lens 3.

It is to be understood that the lens protective cover 4 is arranged to cover, not only the taking lens 3, but also a light receiving window 6 which is used for photometric purpose and located directly above the lens 3, an objective window 7 for viewfinder which is located directly above the window 6, a film speed presetting knob 8 located directly below the taking lens 3 and a flash photography select knob 9 which is located below the knob 8 simultaneously. Consequently, when the lens protective cover 4 is moved to its open position where the exposure of the taking lens 3 is allowed, all of the windows 6, 7, and knobs 8, 9 are exposed through the front surface of the body 2.

Also disposed on the front surface of the body 2 at a location toward the left-hand end thereof and also to the left of the abutment frame 5 is a distance selecting assembly 11 including a knob 12 which is used to establish a desired focussed position for the taking lens 3 and three zone focus pictorial indices 14, with which the knob 12 is brought into alignment. In FIG. 1, numeral 15 indicates a light window for indicating a self-timer and battery checker.

Figure 2:
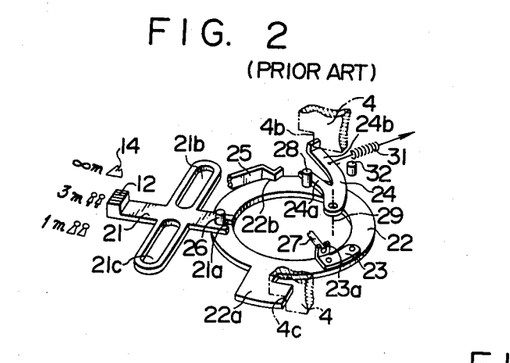
FIG. 2 is a perspective view of one form of conventional apparatus for establishing a normal focussed distance of a taking lens which may be used in the camera shown in FIG. 1.

FIG. 2 shows an example of a conventional arrangement for establishing a normal focussed distance which may be used in the camera 1, shown in FIG. 1. The apparatus shown comprises a distance select member 21 integrally carrying the knob 12, a distance ring 22 disposed for rotation as the distance select member 21 is moved up and down, a drive member 23 for causing a fore-and-aft movement of the taking lens 3 (FIG. 1) along the optical axis in response to rotation of the distance ring 22, a return arm 24 for returning the distance ring 22 to a given position as the lens protective cover 4 is closed, and a leaf spring 25 which defines a click stop for locking the distance ring 22 at its home position.

The distance select member 21 is a strip member of crisscross form, with the knob 12 formed on the left-hand free end of the longitudinal portion. The right-hand end of the longitudinal portion is formed into a fork 21a, engaged by an operating pin 26 which is fixedly mounted on the front surface of the distance ring 22 at a corresponding position. In addition, the distance select member 21 includes a pair of upper and lower lateral extensions in which laterally elongate guide slots 21b, 21c are formed respectively. It is to be understood that these slots are engaged by stationary pins, not shown. In this manner, by operating the knob 12, the distance select member 21 may be moved up and down as such movement is guided by the cooperation between the slots 21b, 21c and the stationary pins.

The distance ring 22 is in the form of an annular disc in which the lens frame or barrel 16 (FIG. 1) of the taking lens 3 is loosely fitted. In addition to the operating pin 26, the distance ring 22 includes an L-shaped member 22a extending from its periphery at an advanced position with respect to the pin 26, as viewed counter-clockwise in FIG. 2. The member 22a is engageable with a step 4c formed on the rear side of the lens protective cover 4. The drive member 23 is secured to the front surface of the distance ring 22 at a position further advanced counter-clockwise than the L-shaped member 22a. The drive member 23 has an L-shaped extension at its one end which projects forwardly, with the free end of the extension being formed into a fork 23a which is engaged by a driven pin 27 fixedly mounted on the outer peripheral surface of the lens barrel 16 (FIG. 1) of the taking lens 3. Accordingly, as the distance ring 22 rotates, the barrel 23 also rotates to cause a fore-and-aft movement of the taking lens 3 along the optical axis for purpose of distance adjustment.

At a position which is lagging behind the operating pin 26, as viewed counter-clockwise in FIG. 2, the outer periphery of the distance ring 22 is formed with a notch 22b, which is engageable with the V-shaped end of the leaf spring 25 when the distance ring 22 assumes its home position, thus defining a click stop. At a position further lagging behind the notch 22b, the distance ring 22 fixedly carries a driven pin 28 on its front surface which is adapted to bear against the return arm 24 to be driven in the returning direction.

The return arm 24 is again formed by a strip member having branched or forked ends while its opposite end is pivotally mounted on a stationary pin 29. Its left-hand arm 24a is disposed so that its left-hand end face is located opposite to the driven pin 28 while its right-hand arm 24b has its free end folded to project forwardly so as to be engageable with the step 4b formed on the rear side of the protective cover 4. The right-hand arm 24b is engaged by one end of a coiled tension spring 31, whereby the return arm 24 is urged to rotate clockwise about the pin 29. However, the resulting angular movement of the arm 24 is limited by the abutment of the right-hand side of the arm 24b against a stop pin 32 which is fixedly mounted on a stationary member, not shown, whenever the lens protective cover 4 assumes its open position.

In operation, when the lens protective cover 4 is brought to its open position where the taking lens 3 is exposed, the steps 4b, 4c formed on the cover 4 move out of engagement with associated members, so that the resilience of the spring 31 permits the return arm 24 to be disengaged from the driven pin 28, clockwise rotating about the pin 29 until it bears against the stop pin 32,. This frees the distance ring 22 from any constraint by the cover 4, and the ring 22 becomes movable angularly with a reduced force which is sufficient to overcome the resilience of the leaf spring 25. Hence, the knob 12 may be operated under this condition, causing a corresponding rotation of distance ring 22 to thereby rotate the lens barrel 16 through the drive member 23 and the driven pin 27, thus moving the taking lens 3 fore-and-aft along the optical axis. Hence, when the knob 12 is aligned with one of the indices 14 corresponding to a desired distance, the camera can be freely established so that the taking lens 3 is focussed to a desired distance. Hence, it is only necessary that the user of the camera depresses a shutter release button, not shown, whereupon a properly focussed photograph can be taken.

Upon completion of a photographing operation, the lens protective cover 4 may be moved to its closed position, whereupon either or at least one of the steps 4b, 4c on the cover 4 engage the return arm 24 and/or the L-shaped member 22a to cause the return arm 24 to be engaged with the driven pin 28 against the resilience of the spring 31, thus returning the distance ring 22 to its home position. In this manner, the knob 12 is moved into alignment with one of the indices 14, shown as a whole figure and corresponding to a normal focussed distance of 3 m, and the cooperation of the drive member 23 and the driven pin 27 is effective to establish a normal focussed distance of 3 m for the taking lens 3 automatically.

Figure 3:
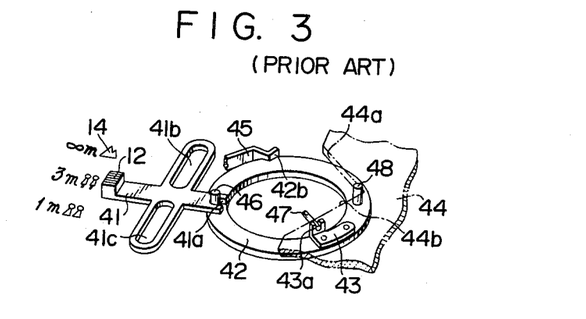
FIG. 3 is a perspective view of another form of apparatus similar to FIG. 2.

FIG. 3 shows another example of apparatus for establishing a normal focussed distance. In this apparatus, the use of the L-shaped member 22a and return arm 24 to return the distance ring 22 to its home position as illustrated in the arrangement of FIG. 2 is replaced by the use of a cam plate 44 and a follower pin 48, which are also effective to return a distance ring 42 to its home position.

The cam plate 44 is disposed on the rear side of the lens protective cover 4, and has a V-shaped notch formed in its left-hand edge which has a width comparable to the outer diameter of the distance ring 42. The notch defines a pair of cam surfaces 44a, 44b. The follower pin 48 is fixedly mounted on the front surface of the distance ring 42, again in the form of an annular disc, at a location corresponding to the bottom of the notch as viewed in FIG. 3.

Other members correspond to those shown in FIG. 2, and hence these members are designated by numerals corresponding to those used in FIG. 2 and to which 20 is added, without repeating their description.

In this arrangement, if the focal length of the taking lens 3 is preset to a shorter distance than 3 m which represents the normal focussed distance when the lens protective cover assumes its open position, the distance ring 42 has rotated counter-clockwise from its home position, so that the follower pin 48 has moved upward from its home position. Accordingly, when the lens protective cover 4 is closed from this condition, the cam plate 44 moves to the left together with the cover 4, causing the follower pin 48 to move down while maintaining it in abutment against the upper cam surface 44a. Accordingly, the distance ring 42 rotates clockwise until its home position is reached while the cooperation between the drive member 43 and driven pin 47 automatically establishes a normal focussed position of the taking lens 3.

If the focal length of the taking lens 3 is established at a value greater than 3 m which represents the normal focussed distance when the lens protective cover assumes its open position, the distance ring 42 has rotated clockwise from its home position, and hence the follower pin 48 has moved down from its home position. When the lens protective cover 4 is closed under this condition, a movement of the cam plate 44 to the left together with the cover 4 causes the follower pin 48 to be raised upward to its home position while maintaining it in abutment against the lower cam surface 44b. Hence, the distance ring 22 rotates counter-clockwise until the home position is reached, whereby the taking lens 3 is returned to its normal focussed position automatically.

It will be therefore seen that the taking lens 3 is returned to its normal focussed position automatically as the lens protective cover 4 is closed, irrespective of the previous focal length of the taking lens 3 which the latter assumed before the shutter is closed.

It will be seen from the foregoing description that with the camera 1 having the apparatus illustrated in FIG. 2 or FIG. 3 disposed therein, the normal focussed position of the taking lens 3 is automatically established as the lens protective cover 4 is opened, so that a picture can be taken without any substantial defocussing effect of almost any object being photographed immediately upon opening the protective cover 4, without requiring any distance adjustment.

However, it will be appreciated that when such camera 1 is used to take pictures of children indoors, the use of an electronic flash is almost essential in view of the brightness factor in order to assure a proper photograph. Hence, a picture is taken in this instance by maintaining the diaphragm open, with consequence that the depth of field of the taking lens 3 is reduced. If an object being photographed is located at a small distance, there might result a defocussed photograph with a rear focus. In addition, with camera 1 using the normal size 35 mm roll film such as a small type having a lens shutter, an object being photographed, such as children is placed in a manner corresponding to the normal focussed distance, the image of the object will be too small in the image field. Hence, the object must be located at a reduced or minimum distance, further contributing to the likelihood that a defocussed photograph with the rear focus may result.

It will be noted that when a flash photography of an object located at minimum distance is attempted with the camera 1, the taking lens 3 may be readjusted from its normal focussed position to its minimum distance before taking a picture. However, such operation is troublesome and the user of the camera has a prejudice that the camera is an auto pan-focus, which causes the user to forget the necessity of such readjustment, frequently resulting in the drawback that defocussed pictures are taken.

SUMMARY OF THE INVENTION

In view of the foregoing, it is an object of the invention to provide an apparatus for establishing a routine shot distance of a taking lens for camera in which the distance of the taking lens which is preset as a lens protective cover is opened or closed may be freely changed to a routine shot distance utilized by a user of the camera.

In accordance with the invention, a routine shot distance of a taking lens for camera is automatically established depending on the intended use of the camera such as devotedly utilizing the camera for taking pictures of children indoors or devotedly taking pictures of mountains. Hence, an intended object can be photographed with the proper focus immediately upon opening the lens protective cover and without requiring a readjustment of the taking lens. This prevents a shutter chance from being missed because of the necessity for readjusting the taking lens. In addition, as the intended use of the camera changes, the routine shot distance of the taking lens can be changed through a very simple operation.

DESCRIPTION OF PREFERRED EMBODIMENTS

Figure 4:
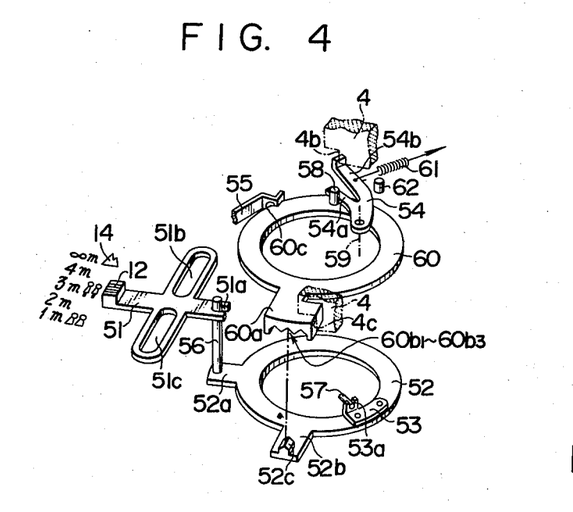
FIG. 4 is an exploded perspective view of an apparatus for establishing a routine shot distance of taking lens, constructed according to one embodiment of the invention.

Referring to FIG. 4, there is shown an apparatus for establishing a routine shot distance of taking lens according to one embodiment of the invention. The apparatus comprises a distance select member 51 integrally carrying the photographing distance select knob 12, a distance ring 52 which rotates as the distance select member 51 moves up and down (hereafter referred to as a second relay member), a linking ring 60, referred to as a first relay member, which is adapted to be temporarily connected integrally with the distance ring 52 for rotation therewith, a drive member 53 integrally connected to the distance ring 52 to cause a fore-and-aft movement of the taking lens 3 along the optical axis as the ring 52 rotates, a return arm 54 for returning the linking ring 60 to its home position in response to the closing movement of the lens protective cover, and a leaf spring 55 which defines a click stop to lock the linking ring 60 at its home position.

The distance select member 51 is constructed in the similar manner as the distance select members 21, 41 shown in FIGS. 2 and 3, and carries the distance select knob 12 on its left-hand end of the longitudinal portion thereof while the right-hand end of the longitudinal portion is formed into a fork 51a, into which is fitted one end of an operating pin 56 which has its other end fixedly mounted on a tab 52a radially extending from the outer periphery of the distance ring 52 at a point on the left-hand side thereof. The member 51 includes a pair of lateral extensions in which elongate guide slots 51b, 51c are formed, respectively.

The distance ring 52 is formed by an annular disc, which includes a link plate 52b extending from the periphery thereof at a point which is further advanced than the tab 52a, as viewed counter-clockwise in FIG. 4. The link plate 52b is formed with a protuberance 52c centrally adjacent to its front end, and has a certain resilience so that the protuberance 52c may be urged into engagement with one of recesses 60b1–60b3, to be described later. The drive member 53, which is similar to the drive members 23, 43 shown in FIGS. 2 and 3, is secured to the front surface of the distance ring 52 at a point which is further advanced than the link plate 52b, as viewed counter-clockwise in FIG. 4. The drive member 53 is provided with a fork 53a which is engaged by a driven pin 57 fixedly mounted on the lens barrel 16 of the taking lens.

The linking ring 60 is formed by an annular disc having the same diameter as the distance ring 52, and is located forwardly of the distance ring 52 so that it is loosely fitted over the lens barrel 16 in the same manner as the ring 52. At a point corresponding to the link plate 52b, a link element 60a extends from the outer periphery of the linking ring 60, and has its free end extended in the counter-clockwise direction for a reduced length, thereby presenting an L-shaped configuration. It should be noted that the thickness of the link element 60a increases toward the radial extremity. On its underside, the free end of the link element 60a is formed with a plurality of recesses 60b1–60b3, which is three in number in the example shown. The right-hand side face of the link element 60a is located opposite to the step 4c formed on the rear side of the lens protective cover 4.

Figure 5:
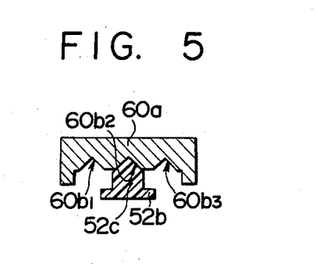
FIG. 5 is an enlarged cross section of a protuberance and recesses used in the apparatus of FIG. 4, illustrating the fitting engagement therebetween.

Referring to FIG. 5, it will be noted that the recesses 60b1–60b3 are in the form of triangular grooves extending in the diametrical direction of the linking ring while the protuberance 52c which is adapted to engage one of them is in the form of a diametrically extending ridge having a triangular top. The protuberance 52c and the recesses 60b1–60b3 are spaced apart by a distance which is sufficient to permit a fitting engagement therebetween with a force of a suitable magnitude so that when the linking ring 60 remains free and is subject to no constraint, an operation of the knob 12 permits the linking ring 60 to rotate while the latter is maintained to be integral with the distance ring 52 as a result of the engagement between the protuberance 52c and one of the recesses 60b1–60b3. On the other hand, when the linking ring 60 is constrained, an operation of the knob 12 permits the protuberance 52c to move past the bevelled surfaces of the recesses 60b1–60b3, as assisted by the resilience of the link plate 52b, to be fitted into the recess which is located next adjacent, as viewed in the direction in which the distance ring 52 is rotated.

When the protuberance 52c is engaged with the leftmost recess 60b1, the distance ring 52 is returned to a position where it establishes the focus of the taking lens 3 at a distance of 4 m, for example, which is intermediate the infinity position corresponding to a chevron-shaped index 14 and an intermediate distance of 3 m corresponding to a whole figure, as the linking ring 60 is returned in response to the closure of the protective cover 4. When the protuberance 52c is engaged with the middle recess 60b2, the distance ring 52 is returned to a position where it causes the taking lens 3 to be focussed at the intermediate distance of 3 m, indicated by a whole figure. Finally, when the protuberance 52c is engaged with the rightmost recess 60b3, the distance ring 53 is returned to a position which causes the taking lens 3 to be focussed to a distance of 2 m, for example, which is intermediate the distance of 3 m corresponding to the whole figure and the minimum distance of 1 m corresponding to the half figure.

A click stop notch 60c is formed in the outer periphery of the linking ring 60 at a point which is lagging behind the angular position of the tab 52a, as viewed counter-clockwise in FIG. 4, and is engageable with the V-shaped free end of a leaf spring 55 when the linking ring 60 assumes its home position. A driven pin 58 is fixedly mounted on the front surface of the linking ring 60 at a point which is further lagging behind the notch 60c, as viewed counter-clockwise in FIG. 4, so as to be engaged and driven by the return arm 54.

The return arm 54 is constructed in the similar manner as the return arm 24 shown in FIG. 2, and has its base end pivotally mounted on a stationary pin 59. Its one arm 54a is located opposite to the driven pin 58 while the other arm 54b is located opposite to the step 4b formed on the cover 4. The arm 54b is engaged by one end of a coiled spring 61, which urges the arm 54 to rotate. However, the extent of the resulting rotation is normally limited by a stop pin 62.

In operation, when the lens protective cover 4 assumes its closed position in which it covers the taking lens 3, the steps 4b, 4c formed thereon bear against the return arm 54 and the link element 60a, respectively, and the arm 54 is in abutment against the driven pin 58. Hence, the linking ring 60 is temporarily maintained at rest at its home position assumed when the cover 4 is closed. When the cover 4 is closed in this manner, assuming that the knob 12 is aligned with the whole figure index 14 so that the taking lens 3 is focussed at the intermediate distance of 3 m, if it is desired to adjust the taking lens 3 to a routine shot distance of 2 m, the knob 12 may be moved to a position where it is aligned with the 2 m index, while holding the cover 4. As the knob 12 is moved down, the force imparted to the distance select member 51 is transmitted through the fork 51a and the operating pin 56 to cause a rotation of the distance ring 52. Since the linking ring 60 is prevented from rotation by the constraint applied by the cover 4, it follows that the distance ring 52 rotates counter-clockwise until the protuberance 52c moves past the bevelled surface of the recess 60b2 to be engaged with the adjacent recess 60b3. As the distance ring 52 rotates, the lens barrel 16 is driven for angular movement through the drive member 53 and the driven pin 57, whereby the taking lens 3 is focussed to a distance of 2 m. In this manner, the routine shot distance is changed from 3 m to 2 m.

Subsequently, when the lens protective cover 4 is moved to its open position where it allows the taking lens 3 to be exposed, steps 4b, 4c on the cover 4 move to their non-engaging positions, so that the resilience of the spring 61 allows the return arm 54 to be disengaged from the driven pin 58 and to rotate clockwise about the pin 59 into engagement with the stop pin 62. Consequently, the linking ring 60 is no longer constrained, and becomes rotatable with a reduced force which is only sufficient to overcome the resilience of the leaf spring 55. Hence the knob 12 may be operated under this condition, and as the distance select member 51 moves up or down, the distance ring 52 is rotated as is the linking ring 60 which is temporarily connected in integral manner therewith through the engagement between the protuberance 52c and the recess 60b3. As the distance ring 52 rotates, the lens barrel 16 is also rotated through the drive member 53 and the driven pin 57, causing a fore-and-aft movement of taking lens 3 along the optical axis. When the knob 12 is aligned with a desired one of the indices 14, any desired focal length of taking lens 3 can be freely established. Hence, the user of the camera may establish a desired focal length for the taking lens 3 which is suitable to take a picture of an object being photographed, and may depress a shutter release button to produce a photograph with the proper focus.

When the lens protective cover 4 is moved to its closed position upon completion of a photographing operation, at least one of the steps 4b, 4c on the cover 4 engages with the return arm 54 and/or link element 60a, whereby the return arm 54 becomes engaged with driven pin 58 to drive the linking ring 60, which is therefore returned to its home position. As the linking ring 60 is returned, a temporary integral connection achieved by the engagement between the protuberance 52c and the recess 60b3 causes the distance ring 52 to rotate also in the same direction. The position assumed by the distance ring 52 when the linking ring 60 has returned to its home position corresponds to a position of the knob 12 which has been previously aligned with the 2 m index 14. Accordingly, the cooperation between the drive member 53 and the driven pin 57 causes the taking lens 3 to be automatically focussed at the distance of 2 m.

While the above description covers the selection of 2 m as a routine shot distance, it should be understood that any other distance such as 3 m or 4 m may be chosen as a routine shot distance for automatically establishing a normal shot distance for the taking lens 3 as the cover 4 is closed.

Since a routine shot distance is automatically established for the taking lens 3 as the lens protective cover 4 is closed, it is possible to take a picture of an object being photographed immediately upon opening the cover 4, without requiring a distance adjustment.

In the embodiment described, three recesses 60b1–60b3 are provided to permit a selection among 2 m, 3 m and 4 m as routine shot distances. However, it should be understood that the number of such recesses may be increased to permit a selection among an increased number of routine shot distances.

In the embodiment described, means which couple the distance ring 52 and the linking ring 60 together in a manner to permit the relative position to be changed comprises the protuberance 52c and the recesses 60b1-60b3. However, the means which couple the both rings 52, 60 together may comprise any other means such as a ball and its fitting opening, crown gears and the like.

It is also to be noted that the apparatus which establishes a normal focussed distance utilizing the cam plate and the follower pin shown in FIG. 3 may be additionally provided with the linking ring to constitute an apparatus for establishing a routine shot distance which is similar to the embodiment described above.

It is also to be noted that while in the embodiment described above, a routine shot distance for the taking lens is established in response to the closing movement of the lens protective cover, but that the routine shot distance may be established in response to the opening movement of the lens protective cover.

Figure 6:
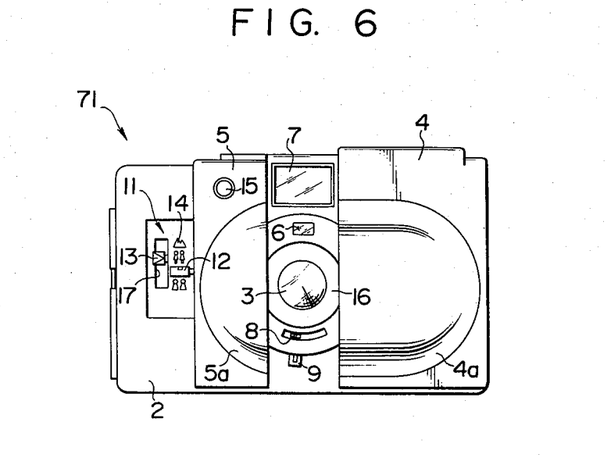
FIG. 6 is a front view of a camera having the apparatus of the invention incorporated therein.

FIG. 6 shows a camera incorporating an apparatus for establishing a routine shot distance according to another embodiment 71 of the invention. Camera 71 is constructed generally in the similar manner as camera 1 shown in FIG. 1, except that a routine shot distance selecting knob 13 is disposed to the left of the indices 14 of the distance selector 11 and is movable in an elongated slot 17. Accordingly, corresponding parts are designated by like reference numerals or characters without repeating their description.

Figure 7:
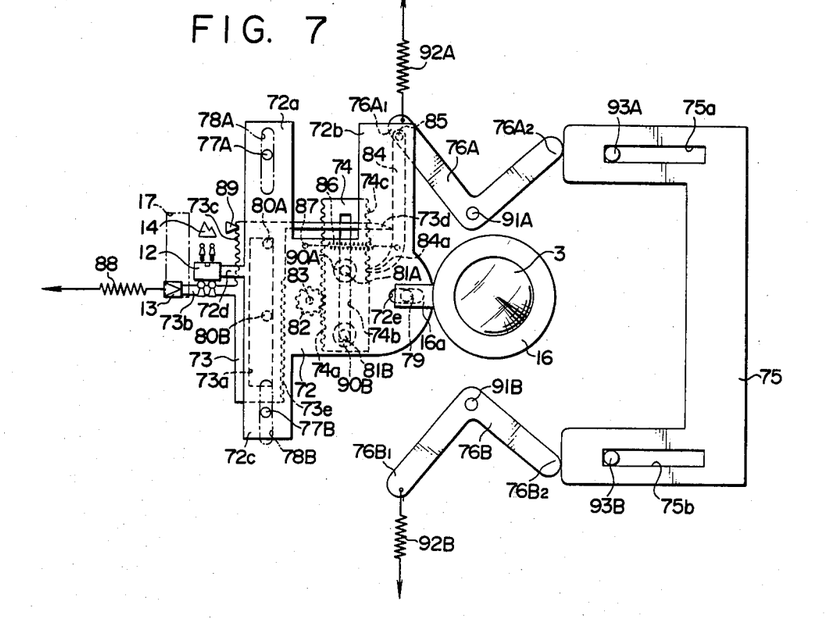
FIG. 7 is a front view of an apparatus for establishing a routine shot distance of taking lens, constructed according to another embodiment of the invention and as disposed within the camera shown in FIG. 6.

FIG. 7 shows the apparatus for establishing a routine shot distance of taking lens according to another embodiment of the invention which is incorporated into the camera 71. The apparatus essentially comprises a lens barrel 16 which supports the taking lens 3, a photographing distance selecting plate 72 which integrally carries a photographing distance select knob 12, a routine shot distance selecting plate 73 which integrally carries a knob 13, a link plate 74 slidably mounted on the distance selecting plate 72 so as to be vertically movable with respect thereto, a cover interlock member 75 integral with the lens protective cover 4 for lateral movement therewith, and a pair of drive levers 76A, 76B which are driven for angular movement by the interlock member 75.

Figure 8:
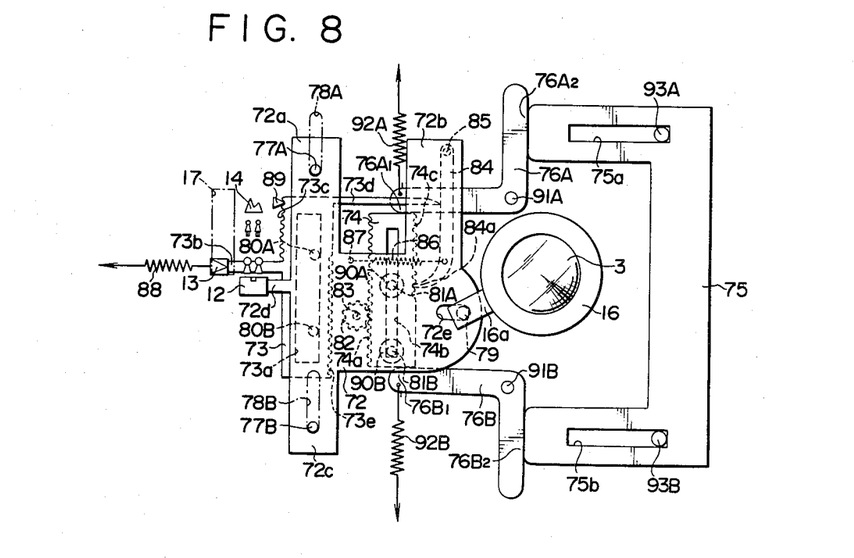
FIG. 8 is a front view illustrating the operation of the apparatus shown in FIG. 7.
Figure 9:
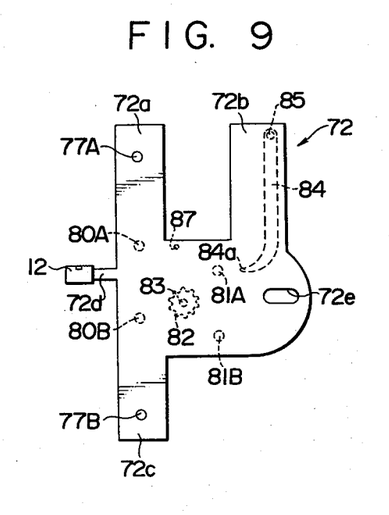
FIGS. 9 to 11 are front views of a photographing distance selecting plate, a routine shot distance selecting plate and a link plate used in the apparatus of FIG. 7.

Referring to FIG. 9, the distance selecting plate 72 comprises a plate having an inverted h-shaped configuration including a pair of upwardly extending limbs 72a, 72b and a downwardly extending limb 72c which is generally aligned with the limb 72a, and a pair of guide pins 77A, 77B are fixedly mounted on the front surface of the limbs 72a, 72c adjacent to their respective ends and fitted into vertically aligned elongated guide slots 78A, 78B (see FIGS. 7 and 8) formed in the rear side of the front wall of the body 2, whereby the selecting plate 72 is slidable in the vertical direction. A thin tab 72d extends to the left from the left-hand lateral edge of the selecting plate 72 at a central point thereon, and the knob 12 is fixedly mounted on the free end of the tab 72d. The selecting plate 72 also includes a circular bulge along its right-hand edge which is centrally formed with a laterally aligned elongated lens drive slot 72e, which is engaged by a driven pin 79 (see FIGS. 7 and 8) fixedly mounted on a tab 16a extending from a lateral edge of the lens barrel 16. In this manner, vertical movement of the selecting plate 72 rotates lens barrel 16, which is then subject to the action of cam means to cause a fore-and-aft movement thereof along the optical axis, thus focussing the taking lens 3 at a selected distance.

It is also to be noted that fixedly mounted on the rear side of the distance selecting plate 72 are a pair of guide pins 80A, 80B for guiding the routine shot distance selecting plate 73; a pair of guide pins 81A, 81B for guiding the link plate 74; a pin 83 on which a pinion 82 (see FIGS. 7 and 8) which causes a movement of the link plate 74 is rotatably mounted; another pin 85 on which one end of a detent arm 84 is rotatably mounted for locking the link plate 74; and a pin 87 having anchored thereto one end of a coiled tension spring 86, the other end of which is engaged with the detent arm 84 adjacent to its free end (see FIGS. 7 and 8).

Figure 10:
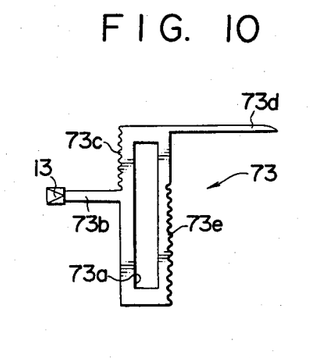

The guide pins 80A, 80B are loosely fitted into a vertically aligned elongated, wide guide slot 73a which is centrally formed in the routine shot distance selecting plate 73, which is in the form of an enlongated rectangle as shown in FIG. 10. A tab 73b extends to the left from the left-hand edge of the selecting plate 73 intermediate its length, with the knob 13 secured to the free end thereof. The knob 13 is engaged by one end of a coiled tension spring 88 (see FIGS. 7 and 8), whereby the routine shot distance selecting plate 73 is normally urged to the left. However, the resulting movement of selecting plate 73 is normally limited by the abutment of the guide pins 80A, 80B against the right-hand surface of the slot 73a. A tooth train 73c is formed in the left-hand edge of the routine shot distance selecting plate 73 above the tab 73b, and is engaged by a detent pawl 89 (see FIGS. 7 and 8) fixedly mounted on a stationary member, not shown, when the selecting plate assumes such limited position, thus preventing a vertical movement of the selecting plate 73 and maintaining it at a position corresponding to a selected routine shot distance.

A release prong 73d extends to the right from the right-hand edge of the selecting plate 73 at its top end, and passes over the front surface of the link plate 74 so that its free end is located opposite to the left-hand end face of the detent arm 84. In addition, a rack 73e is formed in the right-hand edge of the selecting plate 73 in a portion beginning approximately midway and extending to the lower end thereof. In the normal position of the selecting plate 73, the pinion 82 is located opposite to the rack 73e with a slight gap therebetween.

Figure 11:
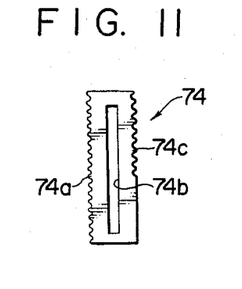

The pinion 82 is disposed for meshing engagement with a rack 74a formed in the left-hand edge of the link plate 74, which is in the form of an elongated rectangle as shown in FIG. 11. The link plate 74 is centrally formed with a vertically aligned elongated guide slot 74b, into which the free end of the guide pins 81A, 81B extends and which pass through spacers 90A, 90B (see FIGS. 7 and 8) in the form of O-rings. In this manner, the link plate 74 is slightly spaced from the rear surface of the photographing distance selecting plate 72 and is slidable in the vertical direction (see FIGS. 7 and 8). A rack 74c is formed in the upper half of the right-hand edge of the link plate 74, and is engaged by a pawl 84a formed on the free end of the detent arm 84, as shown in FIGS. 7 and 8. The engagement between pawl 84a and rack 74c is always maintained to provide a temporary fixed relative position between the link plate 74 and the distance selecting plate 72 since a coiled spring 86 has its one end secured to the arm 84 adjacent to its free end and its other end anchored to the pin 87 to urge the arm 84 to rotate clockwise about the pin 85. The pin 85 is fixedly mounted on the limb 72b of the distance selecting plate 72 adjacent to its free end and toward the right-hand side thereof. When the pawl 84a engages rack 74c, the left-hand end face of the arm 84 is oriented substantially vertically so as to be located opposite to the free end of the release prong 73d of the routine shot distance selecting plate 73. Because the link plate 74 is displaced a slightly spaced distance from the selecting plate 72 by means of the spacers 90A, 90B, the pinion 82 has an increased axial length, and its rear end meshes with the rack 74a on the link plate 74. It is to be noted that the free end of the detent arm 84 rises upward toward its rear end so that the pawl 84a is engageable with the rack 74c.

The drive levers 76A, 76B are L-shaped levers which are pivotally mounted, at their bend, on stationary pins 91A, 91B. The drive levers 76A, 76B are disposed in a common plane with link plate 74 and the cover interlock member 75, and have their one end formed as pushers 76A$_1$, 76B$_1$ which are respectively adapted to bear against the upper and lower end faces of the link plate 74 and have their other ends formed as driven portions 76A$_2$, 76B$_2$ which are adapted to bear against the left-hand end faces of the interlock member 75. It will be noted that the drive levers 76A, 76B have their arms adjacent to the pushers engaged by one end of coiled tension springs 92A, 92B, whereby the levers 76A, 76B are urged to rotate clockwise and counterclockwise, respectively, about their pins 91A, 91B, respectively. However, the resulting angular movement of the levers 76A, 76B is limited by the abutment of the driven portions 76A$_2$, 76B$_2$ against the cover interlock member 75.

The cover interlock member 75 is channel-shaped in configuration and includes an upper and a lower horizontal limb in which horizontally aligned elongated guide slots 75a, 75b are formed, which slots slidably receive guide pins 93A, 93B fixedly mounted on a stationary member, not shown. It will be noted that the left-hand end faces of the horizontal limbs are adapted to bear against the driven portions 76A$_2$, 76B$_2$ of the levers 76A, 76B.

In operation, initially when the lens protective cover 4 is moved to the right to permit the taking lens 3 to be exposed as shown in FIG. 6, it will be seen from FIG. 7 that the cover interlock member 75 has moved to its rightmost position, whereby the drive levers 76A, 76B are urged by the springs 92A, 92B to rotate about the pins 91A, 91B to maintain the driven portions 76A$_2$, 76B$_2$ in abutment against the left-hand end faces of upper and lower horizontal limbs of the interlock member 75 where they remain at rest. Under this condition, the distance selecting plate 72 is subject to no constraint, so that the knob 12 may be moved up and down into alignment with one of the indices 14, whereupon the plate 72 can be moved up or down as permitted by the engagement between the guide pins 77A, 77B and the slots 78A, 78B. As the selecting plate 72 moves up, the cooperation between the drive slot 72e and driven pin 79 causes the lens barrel 16 to rotate clockwise, whereby the taking lens 3 is driven inward into the camera 71. On the contrary, when the distance selecting plate 72 is moved down, the lens barrel 16 rotates counter-clockwise to feed the taking lens 3 forwardly out of the camera 71. In this manner, a focus adjustment of the taking lens 3 is performed.

The routine shot distance can be changed in the open position of the protective cover 4. To change the routine shot distance, the knob 13 is moved up and down into alignment with one of the indices 14 while keeping it displaced to the right against the resilience of the spring 88. Initially, in response to the movement of the knob 13 to the right, the detent pawl 89 is disengaged from the tooth train 73c to permit vertical movement of the routine shot distance selecting plate 73. At the same time, the rack 73e meshes with the pinion 82 to provide an operational connection between the routine shot distance selecting plate 73 and the link plate 74. The free end of the release prong 73d drives against the detent arm 84 to cause it to rotate counterclockwise about the pin 85 against the resilience of the spring 86, thus disengaging the pawl 84a from the rack 74c to permit vertical movement of the link plate 74. Consequently, the knob 13 may be moved up and down, whereby routine shot distance selecting plate 73 will move in the vertical direction while being guided by the guide pins 80A, 80B which slide along the left-hand surface of the guide slot 73a, causing the rack 73e, pinion 82 and rack 74a to move the link plate 74 in the opposite direction from the selecting plate 73. Consequently, the relative position between the distance selecting plate 72 and the link plate 74 changes. In other words, the routine shot distance is changed.

When the knob 13 is released after it has been moved to a position corresponding to a desired routine shot distance, the resilience of the coiled spring 88 returns the routine shot distance selecting plate 73 to the left together with the knob 13 until the right-hand surface of the guide slot 73a bears against the guide pins 80A, 80B, where it stops. When it stops in this manner, the detent pawl 89 is engaged with rack 73c, preventing further movement of the routine shot distance selecting plate 73 in the vertical direction. Simultaneously, the release prong 73d is disengaged, permitted engagement between the pawl 84a and rack 74c, and also preventing further relative movement of the link plate 74 with respect to the distance selecting plate 72. This completes a changing of the routine shot distance.

Assuming that the focal length of the taking lens 3 is chosen at an intermediate position corresponding to a whole figure while the routine shot distance is chosen to be equal to a minimum distance indicated by a half figure as shown in FIG. 7, it will be seen that when the lens protective cover 4 is closed under this condition, the cover interlock member 75 moves to its leftmost position as indicated in FIG. 8. Such movement of the interlock member 75 causes the drive levers 76A, 76B to rotate counter-clockwise and clockwise, respectively, about their respective pins 91A, 91B against the resilience of the coiled springs 92A, 92B, respectively, so that the link plate 74 is moved to a location where the pushers 76A$_1$, 76B$_1$ hold the link plate 74 therebetween. Accordingly, the distance selecting plate 72 which is temporarily connected in integral manner with link plate 74 as a result of the engagement between the pawl 84a and tooth train 74c moves to a routine shot distance determined by its relative position with respect to the link plate 74, which is a minimum distance indicated by a half figure in the present instance. Accordingly, the cooperation between the drive slot 72e and driven pin 79 causes the lens barrel 16 to rotate counter-clockwise, feeding the taking lens 3 forward to a location corresponding to the minimum distance. In this manner, the taking lens 3 is automatically adjusted to the routine shot distance.

The above description assumes that the photographing distance is chosen to be an intermediate distance while the routine shot distance is equal to minimum distance. However, it should be understood that the taking lens 3 is automatically adjusted to routine shot distance which is established by the knob 13 in response to the closing movement of the lens protective cover 4 if other distances are chosen.

It will be seen from the foregoing description that with the apparatus of the present embodiment, the taking lens 3 is again automatically adjusted to a selected routine shot distance in response to the closing movement of the lens protective cover 4, so that an object to be photographed can be taken immediately upon opening the lens protective cover 4 without requiring a distance adjustment.

What is claimed is:

1. An apparatus for establishing a routine shot distance of a taking lens for a camera, comprising:
    a taking lens subject to a force-and-aft movement along an optical axis in response to a distance adjustment;
    a lens protective cover movable between a first position in which it covers the taking lens and a second position in which it allows the taking lens to be exposed;
    relay means for moving the taking lens to a position corresponding to a selected routine shot distance in response to the opening/closing movement of the protective cover; and
    means within said relay means for changing the position of the taking lens which corresponds to the routine shot distance independently of the position of the movable lens protective cover.

2. An apparatus according to claim 1 in which said means within said relay means for changing the routine shot distance comprises a first relay member adapted to be returned to a given position in response to the opening/closing movement of the lens protective cover, a second relay member connected for moving the taking lens to a position corresponding to a selected routine shot distance, and means for temporarily coupling the first and the second relay members in an integral manner.

3. An apparatus according to claim 2 in which the first relay member comprises a linking ring and the second relay member comprises a distance ring, and wherein the coupling means comprises a protuberance on either the linking ring or the distance ring, and cooperating recesses formed in the other of the linking ring and the distance ring and selectively engageable with the protuberance.

4. An apparatus according to claim 3 in which the linking ring is locked against movement when the lens protective cover is closed, and an operation of the distance ring under this condition causes the relative position between the protuberance and the recesses to be forcibly changed, thus changing the position corresponding to the routine shot distance.

5. An apparatus according to claim 1 in which the means for changing the routine shot distance comprises a link plate adapted to be returned to a given position in response to the movement of the lens protective cover, a photographing distance selecting plate adapted to be temporarily connected in an integral manner with the link plate, and a routine shot distance selecting plate for changing the relative position between the link plate and the distance selecting plate.

6. An apparatus according to claim 5 in which the photographing distance selecting plate carries a pinion which is adapted to mesh with a rack formed in one lateral edge of the link plate, the pinion being also meshable with another rack formed in one lateral edge of the routine shot distance selecting plate, an operation of the routine shot distance selecting plate causing the rack thereon to mesh with the pinion to cause one of the photographing distance selecting plate or the link plate to be moved, thereby changing the position corresponding to the routine shot distance.

7. An apparatus according to claim 5 in which the photographing distance selecting plate has a detent arm rockably disposed thereof for locking the link plate against movement relative to the photographing distance selecting plate, an operation of the routine shot distance selecting plate causing a release prong provided thereon to move the detent arm angularly, thereby releasing the link plate for movement relative to the photographing distance selecting plate.

8. An apparatus for establishing a routine shot distance of a taking lens for a camera comprising:
    a taking lens mounted on said camera for movement along its optical axis to focus the camera for a predetermined shot distance;
    a lens protective cover movable between a first position covering said taking lens and a second position exposing said taking lens for permitting a photographing operation;
    first movable means for moving the taking lens to a position corresponding to one of a plurality of routine shot distances;
    lens adjusting means being moved responsive to mvoement of the lens protective cover to said first position; and
    coupling means for engageably coupling said lens adjusting means and said first means in one of a plurality of selective positions relative to one another for causing the lens adjusting means to move the taking lens to any one of a plurality of routine shot distances when the lens protective cover is moved to the first position.

* * * * *